United States Patent
Deschamp et al.

(10) Patent No.: US 9,516,198 B2
(45) Date of Patent: Dec. 6, 2016

(54) VIDEO PROCESSING SYSTEM PROVIDING INTERLACED VIDEO FIELD INVERSION DETECTION FEATURES AND RELATED METHODS

(75) Inventors: Joseph Deschamp, Schwenksville, PA (US); Mihai Petrescu, Schwenksville, PA (US)

(73) Assignee: Imagine Communications Corp., Frisco, TX (US)

( * ) Notice: Subject to any disclaimer, the term of this patent is extended or adjusted under 35 U.S.C. 154(b) by 1801 days.

(21) Appl. No.: 12/021,428

(22) Filed: Jan. 29, 2008

(65) Prior Publication Data

US 2009/0190036 A1    Jul. 30, 2009

(51) Int. Cl.
| | |
|---|---|
| *H04N 19/137* | (2014.01) |
| *H04N 19/172* | (2014.01) |
| *H04N 19/136* | (2014.01) |
| *H04N 7/01* | (2006.01) |
| *H04N 5/14* | (2006.01) |
| *H04N 21/442* | (2011.01) |
| *H04N 5/45* | (2011.01) |

(52) U.S. Cl.
CPC .............. *H04N 5/14* (2013.01); *H04N 7/0115* (2013.01); *H04N 19/136* (2014.11); *H04N 19/137* (2014.11); *H04N 19/172* (2014.11); *H04N 21/44209* (2013.01); *H04N 5/45* (2013.01)

(58) Field of Classification Search
CPC .............. H04N 7/0115; H04N 19/137; H04N 19/172; H04N 19/182; H04N 7/0137
USPC ....... 348/180, 194, 526, 607, 614, 700, 701; 375/240.27, 240.28
See application file for complete search history.

(56) References Cited

U.S. PATENT DOCUMENTS

| | | | |
|---|---|---|---|
| 4,724,487 A | 2/1988 | Casey | 358/183 |
| 6,870,568 B1 | 3/2005 | Hui | 348/458 |
| 6,909,469 B2 | 6/2005 | Adams | 348/700 |
| 7,057,664 B2 * | 6/2006 | Law et al. | 348/448 |
| 7,233,349 B2 | 6/2007 | Mauger et al. | 348/184 |
| 7,391,468 B2 * | 6/2008 | Shah | 348/441 |
| 2002/0105597 A1 * | 8/2002 | Janko et al. | 348/700 |
| 2007/0103486 A1 | 5/2007 | Deschamp | 345/606 |
| 2008/0100750 A1 * | 5/2008 | Baylon et al. | 348/700 |

OTHER PUBLICATIONS

Videotek® QuiC™ Media Analysis Server, Harris Corporation, 2006.

* cited by examiner

*Primary Examiner* — Hai V Tran
*Assistant Examiner* — Jason Thomas
(74) *Attorney, Agent, or Firm* — Tarolli, Sundheim, Covell & Tummino LLP

(57) ABSTRACT

A video processing system may include an input for receiving interlaced video data arranged in successive frames each including odd and even fields. A processor may be coupled to the input for determining an improper inversion of the odd and even fields based upon a pair(s) of successive first and second frames each including successive first and second fields. The processor may generate a first difference value(s) based upon a comparison between the first field in the first frame and the second field in the second frame, and a second difference value(s) based upon a comparison between a second field in the first frame and the first field in the second frame. The processor may determine an improper inversion of the odd and even fields based upon a comparison of the first difference value(s) and the second difference value(s) for the pair(s) of successive first and second frames.

14 Claims, 6 Drawing Sheets

US 9,516,198 B2

VIDEO PROCESSING SYSTEM PROVIDING INTERLACED VIDEO FIELD INVERSION DETECTION FEATURES AND RELATED METHODS

FIELD OF THE INVENTION

The present invention relates to the field of video processing systems, and, more particularly, to video error detection systems and related methods.

BACKGROUND OF THE INVENTION

As broadcasters continue the transition from analog to digital video, the television production process is increasingly conducted in an all-digital domain, that is, from the initial camera shot to the display in the consumer's living room. Compressed digital content is stored as large media files on server networks and produced in a wide variety of file formats, standards and compression algorithms. In such an environment, quality control operators are under increasing pressure to ensure the integrity of digital files before playback, and therefore that the video content is reaching viewers with a desired quality level.

One problem that can occur when using interlaced video is that of field inversion. More particularly, interlaced video is arranged in successive frames, where each frame includes two fields. One field is made up of the odd horizontal lines in a frame, and it is called the odd field or top field since it contains the top line of the image. The other field is made up of the even horizontal lines in a frame, and it is called the even field or bottom field. When interlaced data is displayed, the odd/top field is displayed first followed by the even/bottom field to complete the frame.

While television and interlaced video signals typically have a flag associated therewith to indicate which field is which (i.e., top or bottom), the flag can sometimes inadvertently get changed during the encoding process. Similarly, when combining video from different sources, it is possible that an interlaced video feed may become inverted, i.e., the top and bottom frames are not displayed in the proper order. When this happens, the viewer will typically see artifacts or "ghosts" in the displayed video, as the fields are being displayed in reverse chronological order with fields occurring later in time (i.e., the even fields) being displayed before fields (i.e., the odd fields) that come earlier in time. Yet, to ensure that such a field inversion does not occur in a video playback, an operator is typically required to manually view all or part of the video feed to spot the undesired artifacts, which may be time consuming, cumbersome, and potentially error prone depending upon the skill of the operator.

Various approaches have been developed to alleviate the field inversion problem. One example is disclosed in U.S. Pat. No. 4,724,487 which discloses a picture-in-picture image signal generator that includes a source of an auxiliary video signal and an auxiliary synchronization component separator which produces an auxiliary odd/even field signal. Auxiliary image data is stored in a memory for subsequent retrieval. A source of a main video signal and associated synchronization component separator, which produces a main odd/even field signal, is also provided. A signal combiner combines a portion of the main video signal with data retrieved from the memory to form a picture-in-picture video signal. Furthermore, an interlace inversion detector generates a signal indicating an interlace inversion condition in response to the main and auxiliary odd/even field signals, and a correction to the interlacing is made in response to the interlace inversion signal.

Despite the existence of such systems, further advancements in interlace video field inversion detection may be desired to alleviate the burden on video quality control operators that the detection and correction of this problem may cause.

SUMMARY OF THE INVENTION

In view of the foregoing background, it is therefore an object of the present invention to provide a system and related methods for interlaced video inversion detection and related methods.

This and other objects, features, and advantages are provided by a video processing system which may include an input for receiving interlaced video data arranged in successive frames each including odd and even fields. The interlaced video may be subject to an improper inversion of the odd and even fields, for example. Moreover, the system may further include a processor coupled to the input for determining an improper inversion of the odd and even fields based upon at least one pair of successive first and second frames each comprising successive first and second fields.

More particularly, the processor may be for generating at least one first difference value based upon a comparison between the first field in the first frame and the second field in the second frame, and generating at least one second difference value based upon a comparison between a second field in the first frame and the first field in the second frame. As such, the processor may determine an improper inversion of the odd and even fields based upon a comparison of the at least one first difference value and the at least one second difference value for the at least one pair of successive first and second frames. As such, the system advantageously provides a processor-based approach for determining field inversion in interlaced video, without requiring cumbersome and time-consuming manual video review.

More specifically, each field may include a plurality of lines, and the processor may generate the at least one first difference value based upon at least one subset of lines in the first field in the first frame and at least one corresponding subset of lines in the second field in the second frame. The processor may also generate the at least one second difference value based upon at least one subset of lines in the second field in the first frame, and at least one corresponding subset of lines in the first field in the second frame. Moreover, the processor may further generate the at least one first difference value based upon stepping through respective subsets of lines, and generate the at least one second difference value based upon stepping through respective subsets of lines.

In addition, the processor may determine an improper inversion of the odd and even fields based upon a comparison of the at least one first difference value and the at least one second difference value for a plurality of pairs of successive first and second frames. The processor may also determine a freeze frame condition based upon the at least one first difference value and the at least one second difference value being substantially equal over a plurality of pairs of successive first and second frames. By way of example, the processor may further generate an alert based upon determining an improper inversion of the odd and even fields. The processor may also invert the first and second fields for each frame based upon determining an improper inversion of the odd and even fields.

The processor may determine whether there is an improper inversion of the odd and even fields based upon the at least one second difference value being greater than the at least one first difference value. By way of example, the first and second difference values may include first and second luminance difference values and/or first and second chrominance difference values. The system may also include a memory coupled to the input for storing the interlaced video data.

A video processing method is also provided for interlaced video data arranged in successive frames each comprising odd and even fields, where the interlaced video may be subject to an improper inversion of the odd and even fields. The method may include determining an improper inversion of the odd and even fields based upon at least one pair of successive first and second frames, each comprising successive first and second fields, by generating at least one first difference value based upon a comparison between the first field in the first frame and the second field in the second frame, and generating at least one second difference value based upon a comparison between a second field in the first frame and the first field in the second frame. Furthermore, the at least one first difference value and the at least one second difference value for the at least one pair of successive first and second frames may be compared to determine the improper inversion of the odd and even fields.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
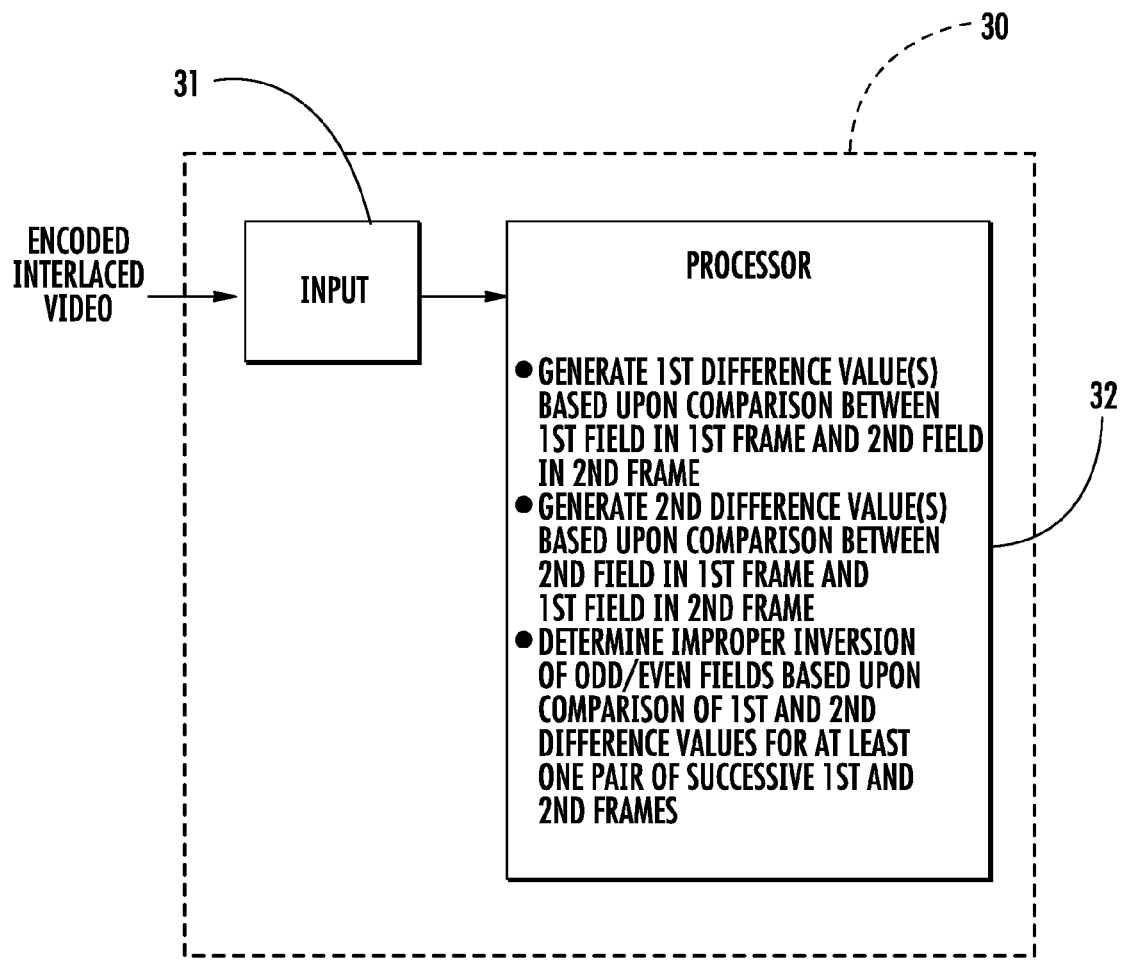
FIG. 1 is a schematic block diagram of a video processing system in accordance with the invention.
Figure 2A:
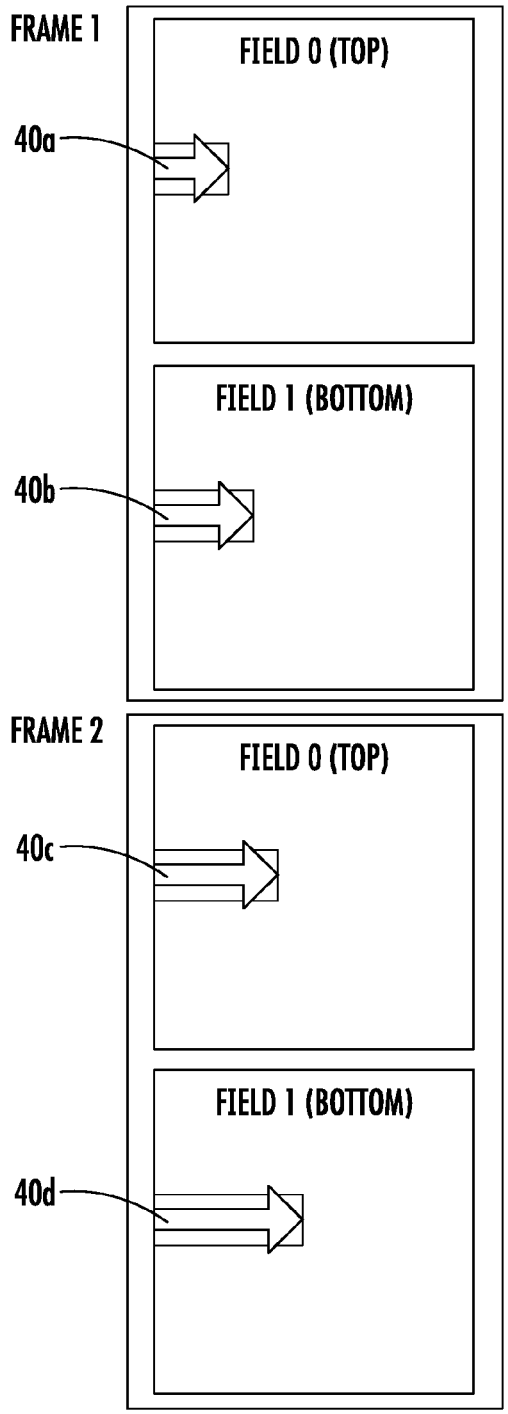
FIGS. 2A and 2B are frame sequence diagrams showing frames of interlaced video data with non-inverted fields and inverted fields, respectively.
Figure 2B:
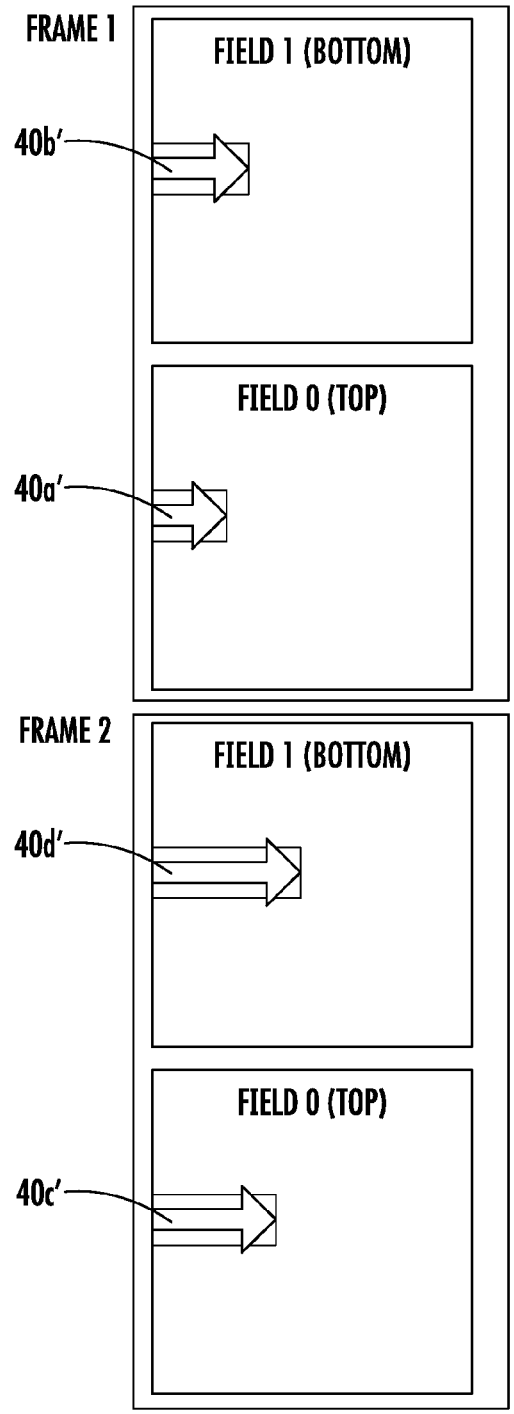
Figure 3:
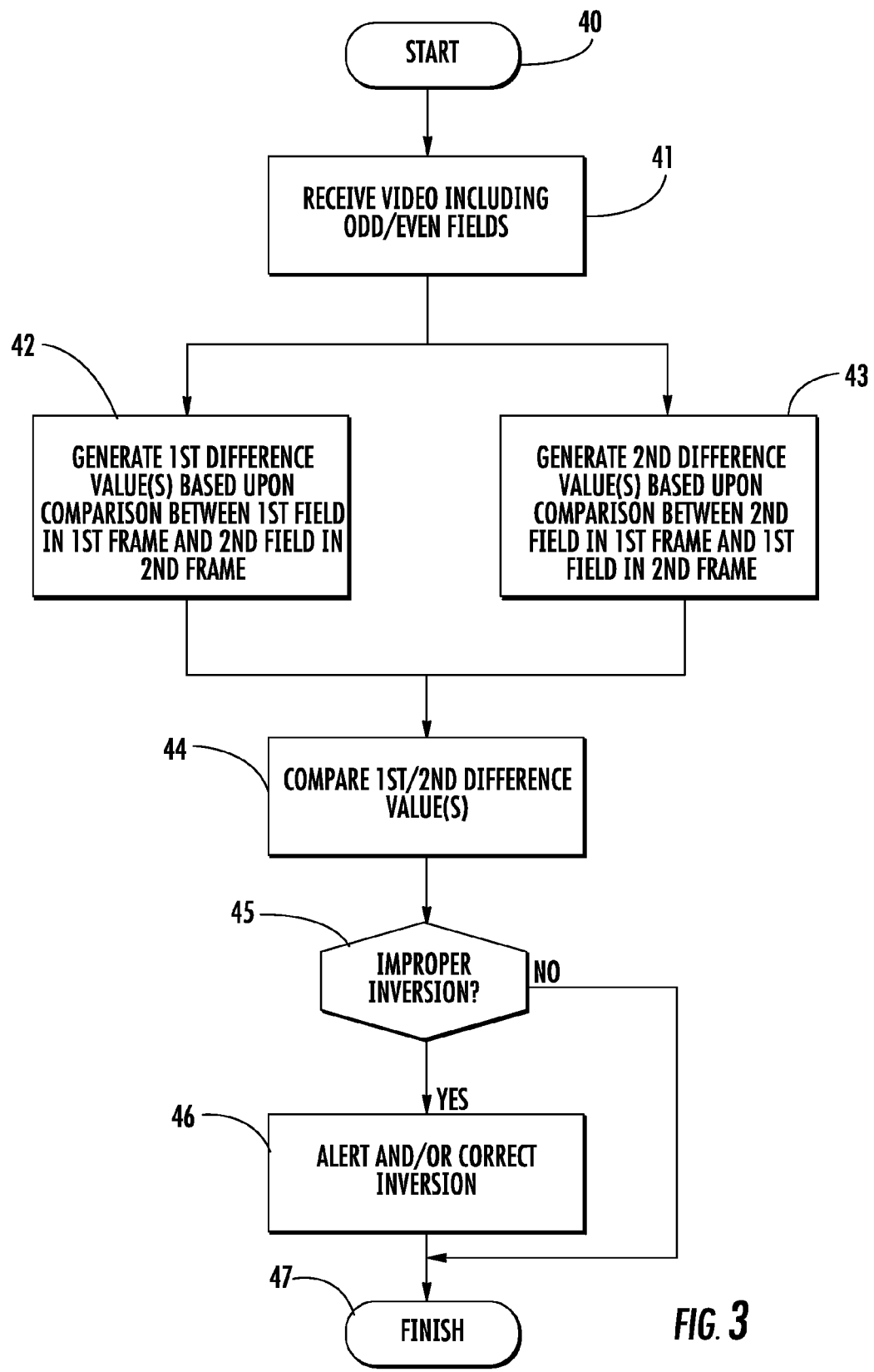
FIG. 3 is a flow diagram illustrating field inversion detection method aspects of the invention.

Referring initially to FIGS. 1 through 3, a video processing system 30 and associated method aspects for field inversion detection in interlaced video are first described. The system 30 illustratively includes an input 31 for receiving interlaced video data arranged in successive frames each including an odd (or top) field and an even (or bottom) field, at Blocks 40-41, as will be appreciated by those skilled in the art. As discussed above, interlaced video is subject to an improper inversion of the odd and even fields, such as by incorrect setting of the top/bottom flag during the encoding process, combining video from different sources, etc. Typically, the interlaced video data is decoded prior to performing the processing operations discussed below.

A processor 32 is illustratively coupled to the input 31 for determining an improper inversion of the odd and even fields based upon one or more pairs of successive first and second frames, each including successive first and second fields, as shown in FIG. 2A. More particularly, the first frame (frame 1) and second frame (frame 2) each have a respective odd/top field (field 0) and even/bottom field (field 1). In the illustrated pair of frames, arrows 40a-40b are shown at four successive points in time to represent an object moving left-to-right through the video sequence. Since in the example illustrated in FIG. 2A the odd and even fields are in the proper order (i.e., odd/top first), each of the arrows 40a-40b appears successively longer than the prior arrow (i.e., the arrow 40b is longer than the arrow 40a, etc.) because they are in the proper chronological order.

By way of comparison, the case in which the odd and even fields of these same two frames are inverted is shown in FIG. 2B. As may be seen, this causes the first arrow 40b' to be longer than the next arrow 40a' in the sequence, and this jumping back and forth creates the above-noted ghosting artifacts since the moving objects in the video sequence are temporally out of order.

Generally speaking, the processor 32 detects an inversion in the odd and even fields by first generating one or more first difference values based upon a comparison between the first field (field 0) in the first frame (frame 1) and the second field (field 1) in the second frame (frame 2), at Block 42. For example, this may be done by comparing corresponding pixels from the two fields (e.g., the row 1/col. 1 (R1,C1) pixel from field 0 of frame 1, and the (R1,C1) pixel from field 1 of frame 2), as will be discussed further below. By way of example, the difference values may be chrominance and/or luminance values.

The processor 32 also similarly generates one or more second difference values based upon a comparison between the second field (field 1) in the first frame (frame 1) and the first field (field 0) in the second frame (frame 1), at Block 43. The first and second differences need not be determined in any particular order, and may be determined in parallel if desired.

The processor 32 may accordingly determine an improper inversion of the odd and even fields based upon a comparison of the first difference value(s) and the second difference value(s) for the pair(s) of successive first and second frames, i.e., frame 1 and frame 2 in the present example, at Blocks 44-45. While a single frame pair may be used to make the inversion determination in some embodiments, in other embodiments it may be desirable to compare first and second differences over a plurality of frame pairs to increase the accuracy of the determination, as will be discussed in the example provided below. More particularly, there are situations, such as stills or frames with little motion, where a relatively small sample (i.e., a small number of frame pairs) will not provide desired accuracy. Yet, using difference values over many frame pairs will typically make an inversion, or other conditions such as a freeze frame, apparent.

If an inversion determination is made, the processor 32 may generate an alert for the system operator, technician, etc., notifying them of the inversion so that it can be corrected, at Block 46, thus concluding the method illustrated in FIG. 3 (Block 47). Otherwise, no action need be taken as shown. In some embodiments, the processor 32 may instead, or in addition, advantageously change the top/bottom field flag on playback, for example, or use other appropriate approaches to automatically correct (i.e., invert) the fields to their proper order with little or no operator intervention. As such, the system 30 advantageously may provide a processor-based approach for determining field inversion in interlaced video, without requiring cumbersome and time-consuming manual video review.

An exemplary approach for determining and comparing the first and second difference values is now described. As noted above, a frame of interlaced data is sent in two fields, i.e., the odd/top field and even/bottom field. Each field is captured sequentially as field 0 (top), then field 1 (bottom). The data for the frame is captured at different times and therefore will have a temporal shift.

As such, if the fields of the received interlaced video data are in proper order (i.e., top field first), then the first difference values should be larger than the second difference values. However, if the bottom field is first (i.e., the fields are inverted), then the second difference values will be greater than the first difference values. For the following example, the first difference values will be designated Dt, and the second difference values will be designated Db. More particularly, Dt is the sum of the absolute value of the pixel difference for every pixel in the two mentioned fields (i.e., field 0 of frame 1, and field 1 of frame 2), whereas Db is the absolute value of the pixel difference for every pixel in field 1 of frame 1, and field 0 of frame 2), for successive pairs of frames.

Upon comparison, if the fields are in proper order (i.e., top field first) then Dt will be greater than Db. However, if the bottom field is first (i.e., the fields are inverted), Db will be greater than Dt. Represented mathematically, if Ti and Bi are the top and bottom fields of frame Fi, where i=0, . . . , n−1; the top field=field 0; the bottom field=field 1; and d(x,y) is the sum of absolute pixel differences of fields x and y, then Dt and Db are given by the relationships:

$$Dt=d(B0,T1)+ \ldots +d(Bn-2,T-1); \text{ and}$$

$$Db=d(B1,T0)++d(Bn-1,Tn-2),$$

for a sum of n−1 distances. If required for improved accuracy, the x operand corresponding to a B field may be pre-shifted up by ½ line by taking line[j]=(line[max(j−1, 0)]+line[j+1])/2 for j=0, . . . , h/2-1, as will be appreciated by those skilled in the art.

Figure 5:
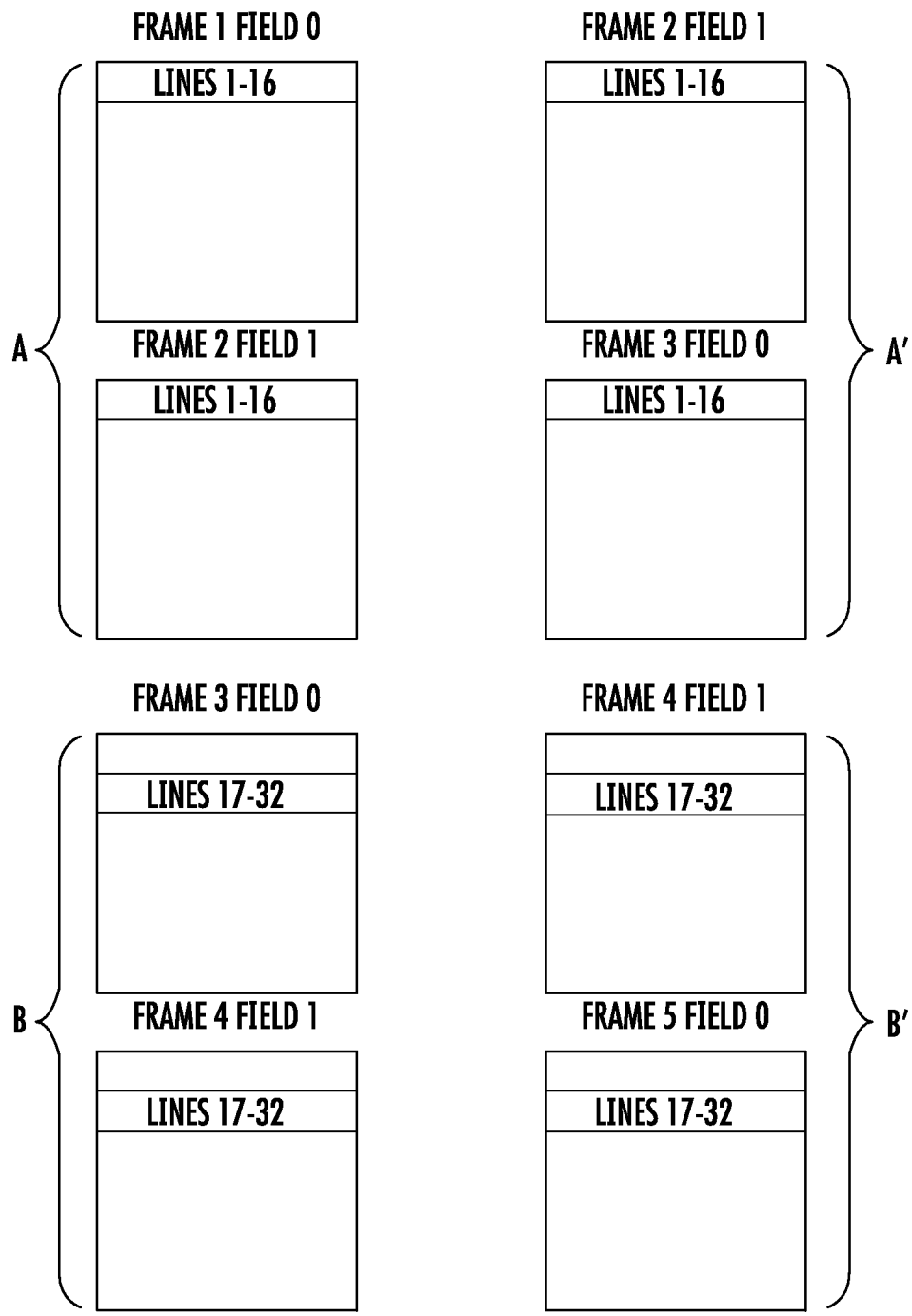
FIGS. 5A and 5B are frame sequence diagrams illustrating the use of field line subsets for inverted field detection by the system of FIG. 1.
Figure 6:
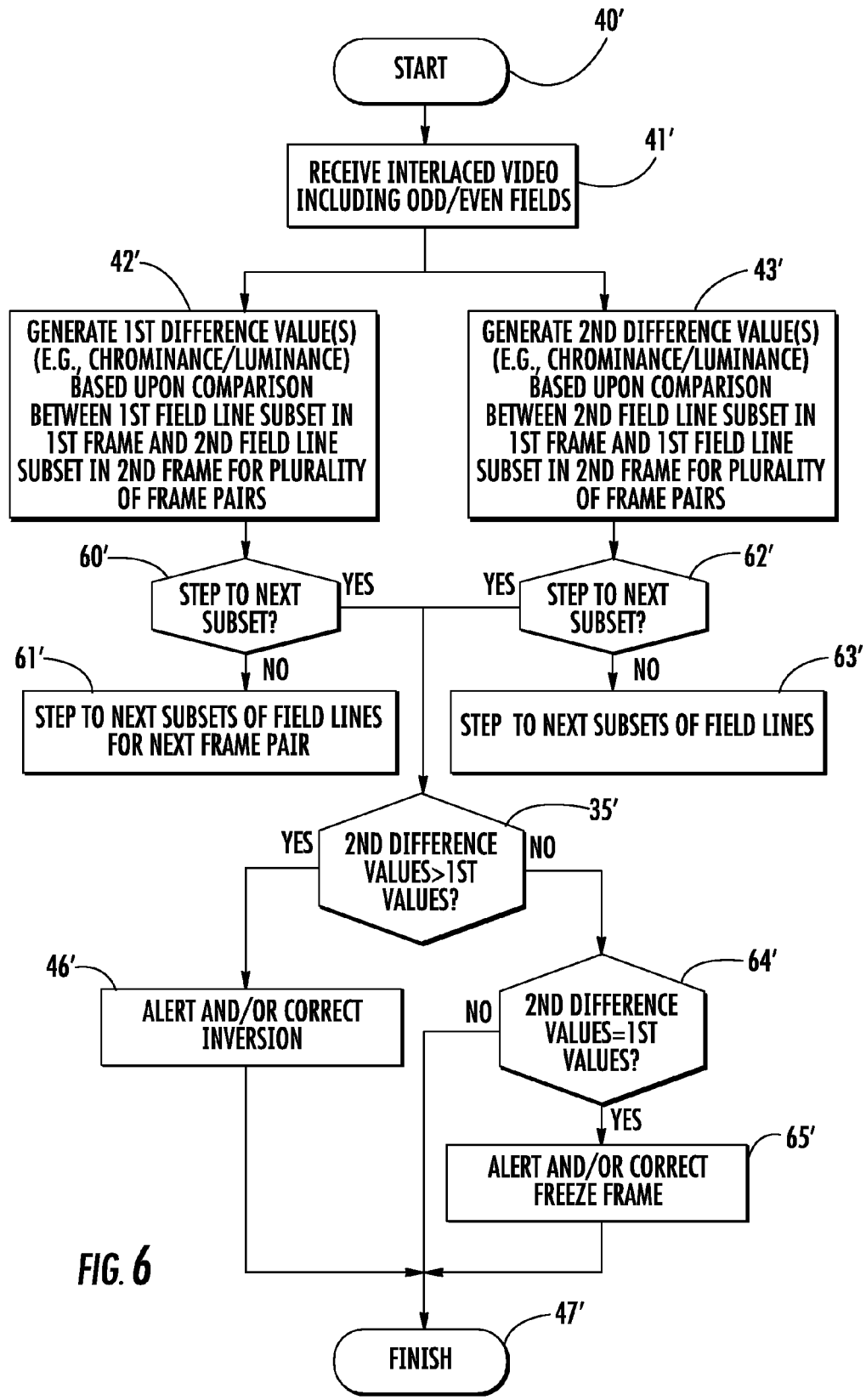
FIG. 6 is a flow diagram of an alternative embodiment of the method of FIG. 3.

Referring now additionally to FIGS. 5 through 6, in some embodiments it may be desirable to implement the comparison in such a way that only a subset of the lines of the fields in question are compared at a time. In the example illustrated in FIG. 5A, the number of lines in the subset is 16, but other numbers may be used. The processor 32 scrolls or steps the line buffer through the field so that over many fields all areas of the field are compared.

Stated alternatively, the processor 32 generates the first difference value based upon a subset of lines in the first field in the first frame, and a corresponding subset of lines in the second field in the second frame (Block 42'). Similarly, the processor 32 generates the second difference value based upon a subset of lines in the second field in the first frame and a corresponding subset of lines in the first field in the second frame (Block 43'). The processor 32 generates the first difference value based upon stepping through respective subsets of lines (Blocks 60'-61'), and generates the second difference value based upon stepping through respective subsets of lines as well (Blocks 62'-63').

Depending upon the given embodiment, different stepping approaches may be used. In the example of FIG. 5A, the processor 32 begins with a subset of lines 1-16 for the first frame pair a, and then steps to a next subset of lines 17-31 for the second frame pair b. Moreover, in this example the frame pairs are successive pair of frames, thus the frame pairs are (1,2), (3,4), etc. In the embodiment illustrated in FIG. 5B, intermediate frame pairs a' (2,3) and b' (4,5) are also used to provide overlap between frame pairs, i.e., each frame is compared with its immediately preceding neighbor frame in one pair and its immediately following neighbor frame in another pair. Moreover, the subset step need not be incremented for each new frame pair. For example, this could be done every other frame pair, etc.

Once all of the frame pairs are compared and the first and second difference values are determined, the processor 32 may then compare the first and second differences to determine whether an inversion has occurred, whether the fields are in the proper order, or whether a third condition has occurred, namely a freeze frame condition. To make this determination, the processor 32 may accumulate the first and second difference values and perform a statistical likeliness of a clip being top field first (or frozen).

For example, if difference values for 1000 frames were calculated and 900 of the comparisons indicated that it was top field first (i.e., the first difference values were greater than the second difference values in 900 cases), then it would be known with 90% accuracy that the video clip in question was top field first. For cases of incorrect field polarity resulting from clip splicing, it may be desirable to use a smaller number of frames for the comparison. By way of example, for the case of 1080 (lines per frame)/2 (fields per frame)/16 (lines captured each field), this would yield 34 frames of data, so it may generally be desirable to use 34 or more frames in this scenario, although other numbers may be used. Also, intervals in a range of 1 or 2 seconds may provide a sufficient window to provide detection without a frame buffer, although the video may be checked over other lengths of intervals in different embodiments.

If a field inversion is detected, an alert may be generated and/or corrective action may be taken, as discussed above (Block 46'). If an inversion is not determined, the processor 32 may also advantageously check to see if the image is frozen, i.e., whether there is a freeze frame. In this case, the first difference values (Dt) will be substantially equal to the second difference values (Db) for most if not all of the frame pairs, at Block 64'. Upon detection of a freeze frame condition, an alert may be generated and/or corrective action may also be taken by the processor 32, as will be appreciated by those skilled in the art, at Block 65'. An exemplary margin of error that may be used for freeze frame detection is about 1-5%, and more particularly about 3%, although other percentages may also be used.

Figure 4:
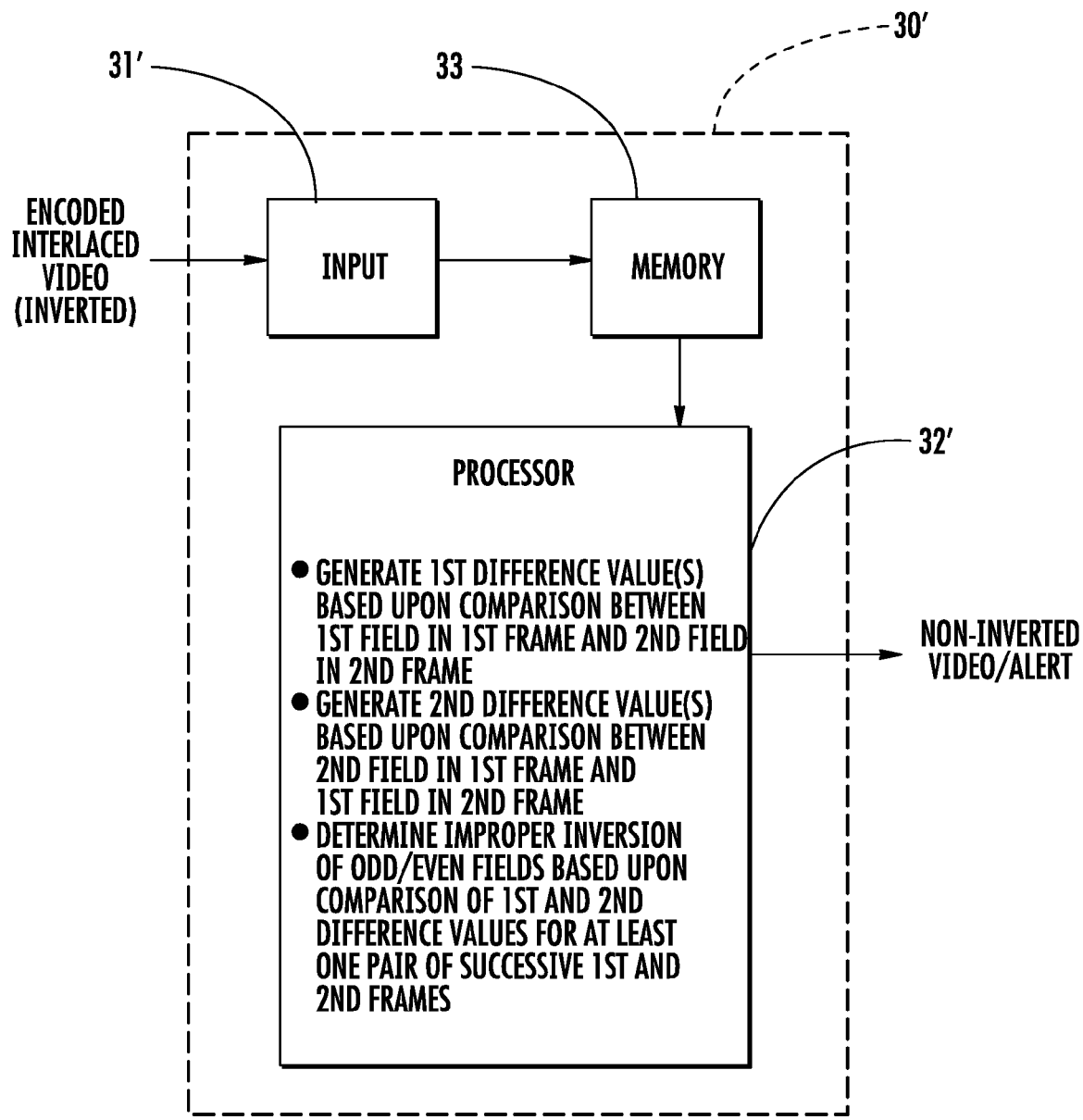
FIG. 4 is an alternative embodiment of the video processing system of FIG. 1.

Referring additionally to FIG. 4, an alternative embodiment of the system 30' illustratively includes a memory 33' for storing received interlaced video data prior to processing by the processor 32'. By way of example, the system 30' may be implemented as a media analysis server used to process video data "offline," i.e., not in real time, during the production and editing process. One exemplary media analysis server in which the above-described features may advantageously be implemented is the Videotek® QuiC™ media analysis server from the Harris Corporation, Assignee of the present application. However, the above-described techniques may be implemented using other platforms, and may also be performed on real-time or live broadcast video data. In this regard, it should be noted that reference to a "processor" herein may include both hardware and software components, including discrete components as well as microprocessors and associated memories, as will be appreciated by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A video processing system comprising:
   an input to receive interlaced video data arranged in successive frames each comprising odd and even fields, the interlaced video data being subject to an improper inversion of the odd and even fields; and
   a processor coupled to the input and to determine the improper inversion of the odd and even fields in the interlaced video data based upon a plurality of successive pairs of first frames and second frames, each comprising successive first and second fields, the processor to:
   compare pixel values between pixels located in a first field in a first frame relative to pixels located in a second field in a second frame over the plurality of successive pairs to generate a plurality of first difference values;
   compare pixel values computed between pixels located in a second field in the first frame relative to pixels located in the first field in a second frame over the plurality of successive pairs to generate a plurality of second difference values;
   determine a number of the plurality of first difference values that is greater than the plurality of second difference values by comparing the plurality of first difference values to the plurality of second difference values;
   determine the improper inversion in the interlaced video data based on the determined number being less than a threshold; and
   determine a freeze frame condition based upon the plurality of first difference values and the plurality of second difference values being equal over the plurality of successive pairs of the first frames and the second frames.

2. The video processing system of claim 1 wherein each field comprises a plurality of lines; wherein the processor is to generate the plurality of first difference values based upon at least one subset of lines in the first field in the first frame and at least one corresponding subset of lines in the second field in the second frame; and wherein the processor is to generate the plurality of second difference values based upon at least one subset of lines in the second field in the first frame and at least one corresponding subset of lines in the first field in the second frame.

3. The video processing system of claim 2 wherein the processor is further to generate the plurality of first difference values based upon stepping through respective subsets of lines, and generate the plurality of second difference values based upon stepping through respective subsets of lines.

4. The video processing system of claim 1 wherein the processor is further to generate an alert based upon determining the improper inversion of the odd and even fields.

5. The video processing system of claim 1 wherein the processor is further to invert the first and second fields for each frame based upon determining the improper inversion of the odd and even fields.

6. The video processing system of claim 1 wherein the plurality of first and second difference values comprise first and second luminance difference values.

7. The video processing system of claim 1 the plurality of first and second difference values comprise first and second chrominance difference values.

8. The video processing system of claim 1 further comprising a memory coupled to the input and to store the interlaced video data.

9. A video processing method for interlaced video data arranged in successive frames each comprising odd and even fields, the interlaced video data being subject to an improper inversion of the odd and even fields, the method comprising:
   determining the improper inversion of the odd and even fields in the interlaced video data based upon a plurality of successive pairs of first frames and second frames, each comprising successive first and second fields, by at least:
   comparing pixel values between pixels located in a first field in a first frame relative to pixels located in a second field in a second frame over the plurality of successive pairs to generate a plurality of first difference values;
   comparing pixel values computed between pixels located in a second field in the first frame relative to pixels located in the first field in a second frame over the plurality of successive pairs to generate a plurality of second difference values;
   determining a number of the plurality of first difference values that is greater than the plurality of second difference values by comparing the plurality of first difference values and the plurality of second difference values;
   determining the improper inversion in the interlaced video data based upon the determined number being less than a threshold; and
   determining a freeze frame condition based upon the plurality of first difference values and the plurality of second difference values being equal over the plurality of successive pairs of the first frames and the second frames.

10. The method of claim 9 wherein each field comprises a plurality of lines; wherein generating the plurality of first difference values comprises generating the plurality of first difference values based upon at least one subset of lines in the first field in the first frame and at least one corresponding subset of lines in the second field in the second frame; and wherein generating the plurality of second difference values comprises generating the plurality of second difference values based upon at least one subset of lines in the second field in the first frame and at least one corresponding subset of lines in the first field in the second frame.

11. The method of claim 10 wherein generating the plurality of first difference values comprises generating the plurality of first difference values based upon stepping through respective subsets of lines, and wherein generating the plurality of second difference values comprises generating the plurality of second difference values based upon stepping through respective subsets of lines.

12. The method of claim 9 wherein comparing comprises comparing the plurality of first difference values and the plurality of second difference values for a plurality of pairs of successive first and second frames.

13. The method of claim 9 further comprising generating an alert based upon determining the improper inversion of the odd and even fields.

14. The method of claim 9 further comprising inverting the first and second fields for each frame based upon determining the improper inversion of the odd and even fields.

\* \* \* \* \*